(12) United States Patent
Jiao et al.

(10) Patent No.: US 9,994,961 B2
(45) Date of Patent: Jun. 12, 2018

(54) ELECTROCATALYST FOR HYDROGEN EVOLUTION AND OXIDATION REACTIONS

(71) Applicants: Feng Jiao, Newark, DE (US); Qi Lu, Newark, DE (US); Gregory S. Hutchings, Gainesville, FL (US); Jingguang Chen, Hockessin, DE (US)

(72) Inventors: Feng Jiao, Newark, DE (US); Qi Lu, Newark, DE (US); Gregory S. Hutchings, Gainesville, FL (US); Jingguang Chen, Hockessin, DE (US)

(73) Assignees: UNIVERSITY OF DELAWARE, Newark, DE (US); THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 382 days.

(21) Appl. No.: 14/796,338

(22) Filed: Jul. 10, 2015

(65) Prior Publication Data
US 2016/0010228 A1 Jan. 14, 2016

Related U.S. Application Data

(60) Provisional application No. 62/023,202, filed on Jul. 11, 2014.

(51) Int. Cl.
| | | |
|---|---|---|
| C25B 11/04 | (2006.01) |
| C22C 9/00 | (2006.01) |
| H01M 4/90 | (2006.01) |
| H01M 4/86 | (2006.01) |
| H01M 8/1018 | (2016.01) |

(52) U.S. Cl.
CPC ............ *C25B 11/0447* (2013.01); *C22C 9/00* (2013.01); *C25B 11/04* (2013.01); *H01M 4/9041* (2013.01); *H01M 2004/8684* (2013.01); *H01M 2008/1095* (2013.01)

(58) Field of Classification Search
CPC .............................. C22C 9/00; C25B 11/0447
USPC .......................................................... 204/293
See application file for complete search history.

(56) References Cited

U.S. PATENT DOCUMENTS

2013/0011736 A1* 1/2013 Loveness ............ H01M 4/0492
429/212

OTHER PUBLICATIONS

Ahmadi, M. et al., "Long-range segregation phenomena in shape-selected bimetallic nanoparticles: chemical state effects," ACS Nano 7, pp. 9195-9204, 2013.
(Continued)

*Primary Examiner* — Weiping Zhu
(74) *Attorney, Agent, or Firm* — RatnerPrestia

(57) ABSTRACT

A metallic alloy includes Cu and one or more metals M selected from the group consisting of Ti, V, Cr, Mn, Fe, Co, Ni and Zn, wherein the alloy has a surface in the form of a vermiculated arrangement of irregular, nanoporous lands separated by troughs or channels. It can be made by contacting a precursor alloy including Cu, M and Al with a caustic liquid under conditions sufficient to remove the Al. Or, a metallic alloy includes Cu and one or more metals M selected from the group consisting of Ti, V, Cr, Mn, Fe, Co, Ni and Zn, wherein the one or more metals M in total constitute in a range of 3 at. % to 7 at. %, relative to the total of Cu and M. Both types of alloy can be used as an electrocatalyst in a water electrolyzer or a hydrogen fuel cell.

21 Claims, 24 Drawing Sheets

(56) References Cited

OTHER PUBLICATIONS

Bar-Even, A. et al., "Design and analysis of synthetic carbon fixation pathways," PNAS, 2010, vol. 107, No. 19, pp. 8889-8894.
Bhaysar, S. et al., "Chemical looping: To combustion and beyond," Catalysis Today 228, pp. 9-105, 2014.
Chen, W.-F. et al. "Biomass-derived electrocatalytic composites for hydrogen Evolution," 2013, Energy & Environmental Science, vol. 6, pp. 1818-1826.
Chen, W. F. et al. "Highly active and durable nanostructured molybdenum carbide electrocatalysts for hydrogen production," Energy & Environmental Science 6, pp. 943-951, 2013.
Chen, Z. et al., "Core-shell MoO3—MoS2 Nanowires for Hydrogen Evolution: A Functional Design for Electrocatalytic Materials," Nano Letters 11, pp. 4168-4175, 2011.
Cui, C. et al., "Shape-selected bimetallic nanoparticle electrocatalysts: evolution of their atomic-scale structure, chemical composition, and electrochemical reactivity under various chemical environments," Farady Discussons 162, pp. 91-112, 2013.
Danilovic, N. et al., "Enhancing the Alkaline Hydrogen Evolution Reaction Activity through the Bifunctionality of Ni(OH)2/Metal Catalysts," Angewandte Chemie-International Edition 51, 12495-12498, 2012.
Durst, J. et al., "New Insights into the Electrochemical Hydrogen Oxidation and Evolution Reaction Mechanism," Apr. 11, 2014, Energy & Environmental Science, pp. 1-6.
Esposito, D. V. & Chen, J. G., "Monolayer platinum supported on tungsten carbides as low-cost electrocatalysts: opportunities and limitations" Energy & Environmental Science, vol. 4, pp. 3900-3912, 2011.
Esposito, D. V. et al., "A New Class of Electrocatalysts for Hydrogen Production from Water Electrolysis: Metal Monolayers Supported on Low-Cost Transition Metal Carbides," J. Am. Chem. Soc., vol. 134, pp. 3025-3033, 2012.
Fujita, T. et al., "Atomic origins of the high catalytic activity of nanoporous gold," 2012, Nature Materials, vol. 11, pp. 775-780.
Gan, L. et al., "Understanding and Controlling Nanoporosity Formation for Improving the Stability of Bimetallic Fuel Cell Catalysts," Nano Letters 13, pp. 1131-1138, 2013.
Ge, X. et al., "Nanoporous metal enhanced catalytic activities of amorphous molybdenum sulfide for high-efficiency hydrogen production," Advanced materials, vol. 26, pp. 3100-3104, 2014.
Greeley, J.et al. "Computational high-throughput screening of electrocatalytic materials for hydrogen evolution, "Nature Materials, vol. 5, pp. 909-913, 2006.
Grimaud, A. et al., "Double perovskites as a family of highly active catalysts for oxygen evolution in alkaline solution," Nature Communications 4, 2013, pp. 1-7.
Hoffert, M. I. et al. "Advanced technology paths to global climate stability: Energy for a greenhouse planet," 2002, Science, vol. 298, pp. 981-987.
Jaramillo, T. F. et al., "Identification of active edge sites for electrochemical H2 evolution from MoS2 nanocatalysts," 2007, Science, vol. 317, pp. 100-102.
Karunadasa, H. I. et al., "A Molecular MoS2 Edge Site Mimic for Catalytic Hydrogen Generation," Science, vol. 335, pp. 698-702, 2012.
Kibsgaard, J. et al., "Building an appropriate active-site motif into a hydrogen-evolution catalyst with thiomolybdate [Mo3S13] 2—Clusters," Nature Chemistry vol. 6, pp. 248-253, 2014.
Kibsgaard, J. et al., "Engineering the surface structure of MoS2 to preferentially expose active edge sites for electrocatalysis," 2012, Nature Materials, vol. 11, pp. 963-969.
Kowal, A. et al., "Ternary Pt/Rh/SnO2 electrocatalysts for oxidizing ethanol to CO2," 2009, Nature Materials, vol. 8, pp. 325-330.
Lewis, N. S. & Nocera, D. G., "Powering the planet: Chemical challenges in solar energy utilization," 2006, PNAS, vol. 103, No. 43, pp. 15729-15735.
Liao, L. et al. "A nanoporous molybdenum carbide nanowire as an electrocatalyst for hydrogen evolution reaction," 2014, Energy & Environmental Science, vol. 7, pp. 387-392.
Lu, Q. et al., "Highly Porous Non-Precious Bimetallic Electrocatalysts for Efficient Hydrogen Evolution," Nature Communications, 2015, pp. 1-8.
Lu, Q. et al. "A selective and efficient electrocatalyst for carbon dioxide reduction," Jan. 30, 2014, Nature Communications, pp. 1-5.
McCrory, C. et al., "Benchmarking Heterogeneous Electrocatalysts for the Oxygen Evolution Reaction,". J. Am. Chem. Soc., vol. 135, pp. 16977-16987, 2013.
Norskov, J. K. et al., "Trends in the exchange current for hydrogen evolution," 2005, Journal of the Electrochemical Society, vol. 152, No. 3, pp. J23-J26.
Oezaslan, M. et al., "PtCu3, PtCu and Pt3Cu Alloy Nanoparticle Electrocatalysts for Oxygen Reduction Reaction in Alkaline and Acidic Media," Journal of the Electrochemical Society 159, pp. B444-B454, 2012.
Oezaslan, M. et al., "Size-Dependent Morphology of Dealloyed Bimetallic Catalysts: Linking the Nano to the Macro Scale," J. Am. Chem. Soc., vol. 134, pp. 514-524, 2012.
Peng, Z. et al., "A Reversible and Higher-Rate Li—O—2 Battery," Science, vol. 337, pp. 563-566, 2012.
Poizot, P. & Dolhem, F, "Clean energy new deal for a sustainable world: from non-CO2 generating energy sources to greener electrochemical storage devices," Energy & Environmental Science, vol. 4, pp. 2003-2019, 2011.
Popczun, E. J. et al., "Nanostructured Nickel Phosphide as an Electrocatalyst for the Hydrogen Evolution Reaction," J. Am. Chem. Soc., vol. 135, pp. 9267-9270, 2013.
Porosoff, M. et al., "Molybdenum Carbide as Alternative Catalysts to Precious Metals for Highly Selective Reduction of CO2 to CO," Angewandte Chemie International Edition, vol. 53, pp. 6705-6709, 2014.
Quadrelli, E. A. et al., "Carbon Dioxide Recycling: Emerging Large-Scale Technologies with Industrial Potential," Chemsuschem, vol. 4, pp. 1194-1215, 2011.
Sasaki, K. et al., "Highly stable Pt monolayer on PdAu nanoparticle electrocatalysts for the oxygen reduction reaction," Nature Communications 3, pp. 1-9, 2012.
Savadogo, O. & Ndzebet, E. "Hydrogen Evolution Reaction (Her) in an Acidic or Basic-Medium on Nickel Electrodeposited with PW12O40(3-) and CU2+," J. Appl. Electrochem. 23, pp. 915-921, 1993.
Sheng, W. et al., "Correlating the hydrogen evolution reaction activity in alkaline electrolytes with the hydrogen binding energy on monometallic surfaces," Energy & Environmental Science, vol. 6, pp. 1509-1512, 2013.
Sheng, W. et al., "Hydrogen Oxidation and Evolution Reaction Kinetics on Platinum: Acid vs Alkaline Electrolytes," Journal of the Electrochemical Society, vol. 157, No. 11, pp. B1529-B1536, 2010.
Sheng, W. et al. "Correlating Hydrogen Oxidation/Evolution Reaction Activity on Platinum at Different pH with Measured Hydrogen Binding Energy," Nature Communcations 6, pp. 5848, 2014.
Sivula, K. et al., "Solar Water Splitting: Progress Using Hematite (alpha-Fe2O3) Photoelectrodes," Chemsuschem, vol. 4, pp. 432-449, 2011.
Snyder, J. et al., "Oxygen reduction in nanoporous metal-ionic liquid composite electrocatalysts," 2010, Nature Materials vol. 9, pp. 904-907.
Strasser, P. et al., "Lattice-strain control of the activity in dealloyed core-shell fuel cell catalysts," 2010, Nature Chemistry, vol. 2, pp. 454-460.
Strmcnik, D. et al., "Improving the hydrogen oxidation reaction rate by promotion of hydroxyl adsorption," Nature Chemistry, vol. 5, pp. 300-306, 2013.
Subbaraman, R. et al., "Enhancing Hydrogen Evolution Activity in Water Splitting by Tailoring Li+-Ni(OH)(2)-Pt Interfaces," Science, vol. 334, pp. 1256-1260, 2011.
Suntivich, J. et al., "A Perovskite Oxide Optimized for Oxygen Evolution Catalysis from Molecular Orbital Principles," Science, vol. 334, pp. 1383-1385, 2011.

(56) References Cited

OTHER PUBLICATIONS

Trasatti, S. "Work Function, Electronegativity, and Electrochemical Behavior of Metals III Electrolytic Hydrogen Evolution in Acid Solutions," J. Electroanal. Chem., vol. 39, pp. 163-184, 1972.

Turner, J. A. "Sustainable hydrogen production," Science, vol. 305, pp. 972-974, 2004.

Voiry, D. et al., "Enhanced catalytic activity in strained chemically exfoliated WS2 nanosheets for hydrogen evolution," 2013, Nature Materials, vol. 12, pp. 850-855.

Wang, H. et al., "Electrochemical tuning of vertically aligned MoS2 nanofilms and its application in improving hydrogen evolution reaction," 2013, PNAS Early Edition, pp. 1-6.

Williams, F. L. & Nason D. "Binary Alloy Surface Compositions from Bulk Alloy Thermodynamic Data," Surface Science 45, pp. 377-408, 1974.

Yan, W. & Hoekman, S. K., "Production of CO2-Free Hydrogen From Methane Dissociation: A Review, "Environmental Progress & Sustainable Energy, vol. 33, No. 1, pp. 213-219, 2014.

Zheng, Y. et al., "Hydrogen evolution by a metal-free electrocatalyst," Apr. 28, 2014, Nature Communications, vol. 5, pp. 1-8, supplemental pp. 1-22.

Zhu, W. et al., "Monodisperse Au Nanoparticles for Selective Electrocatalytic Reduction of CO2 to CO," J. Am. Chem. Soc., vol. 135, pp. 16833-16836, 2013.

\* cited by examiner

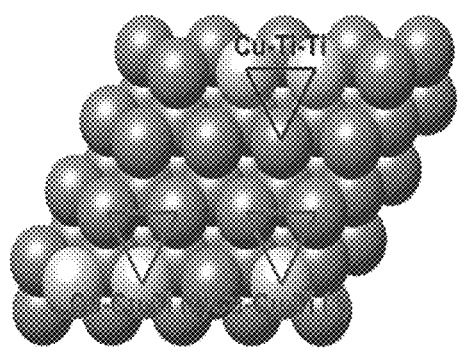 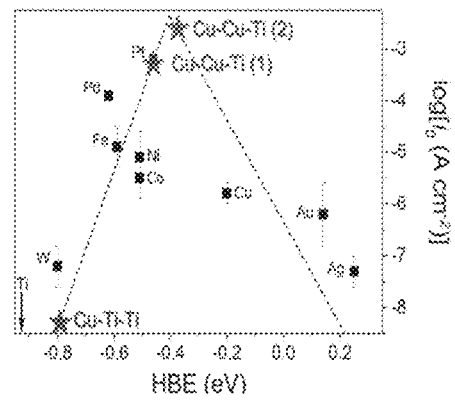
FIG. 1a
FIG. 1b

FIG. 2a
FIG. 2b
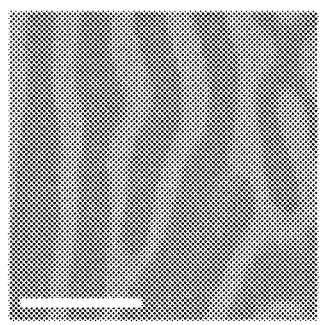
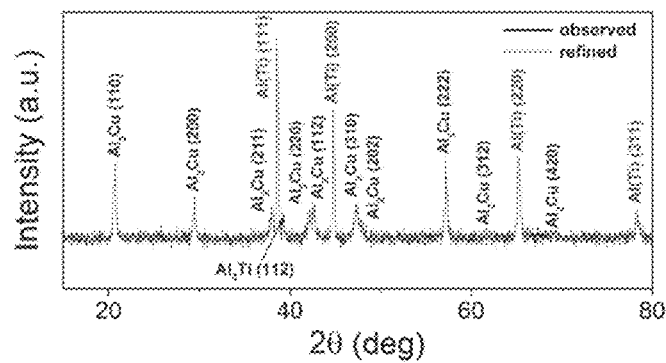

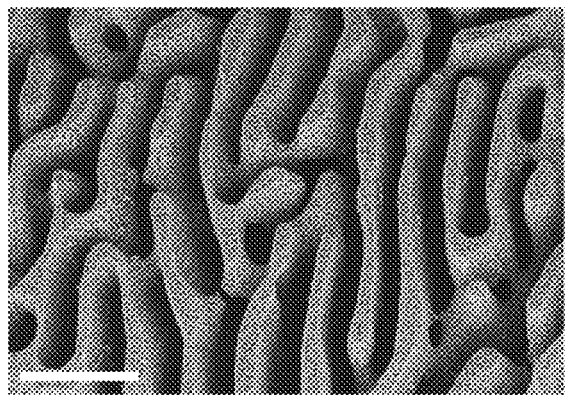
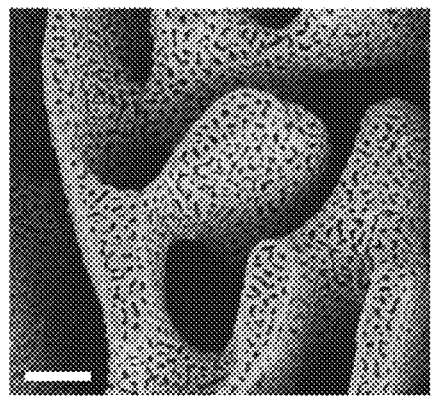
FIG. 2f
FIG. 2g

FIG. 4a
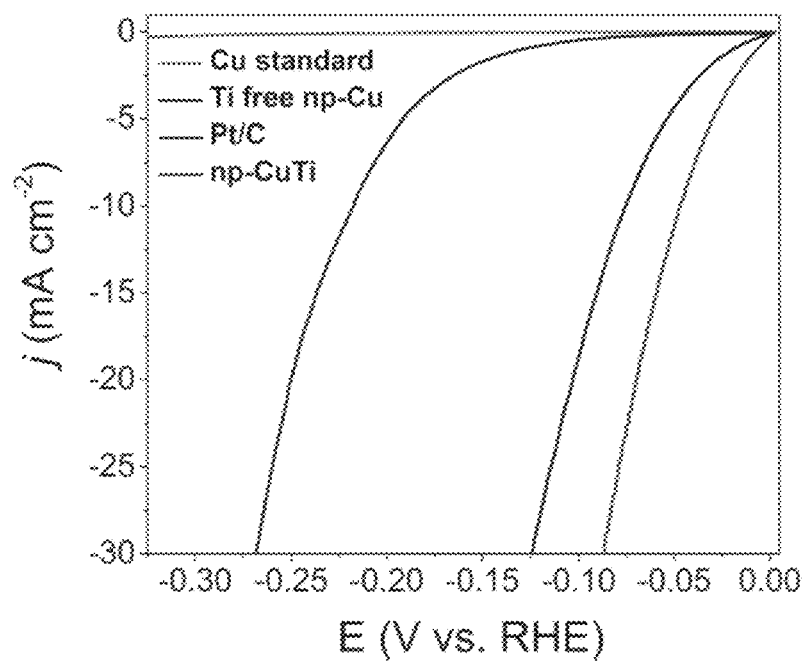
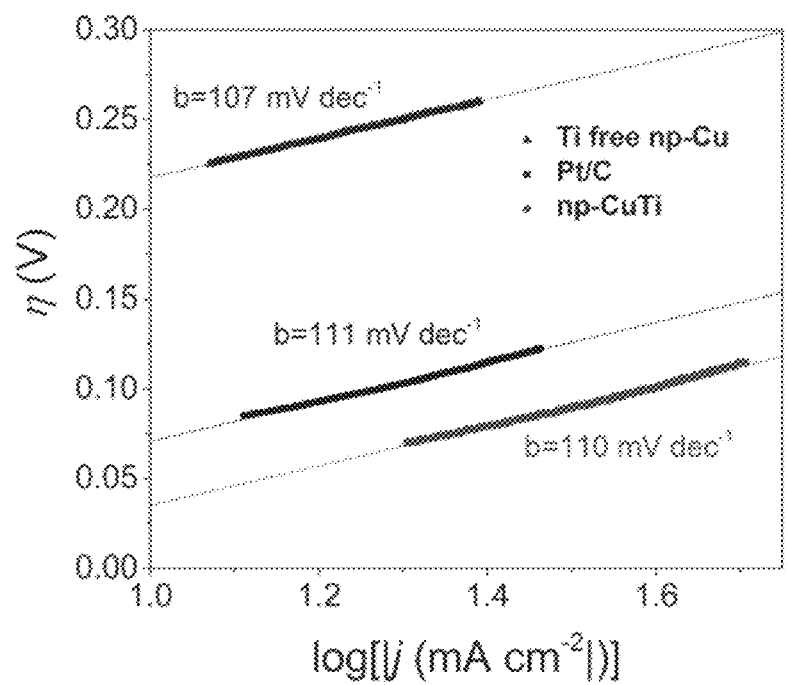
FIG. 4b

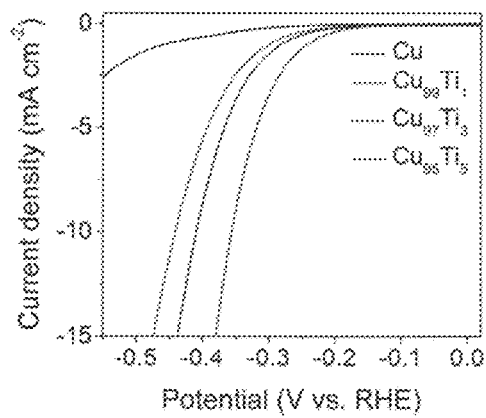
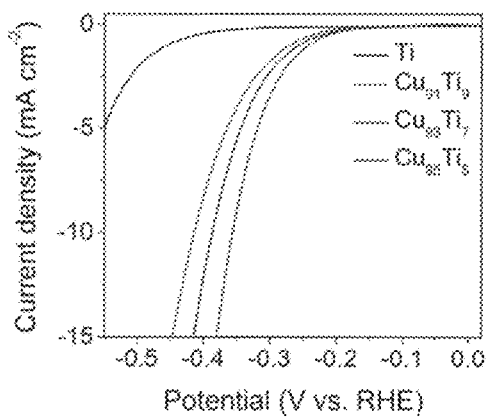
FIG. 7a
FIG. 7b

| Adsorption Configuration | Hollow Site Type | Geometry | Calculated HBE (eV) |
|---|---|---|---|
| Cu-Cu-Cu | hcp |  | -0.09 |
| Cu-Cu-Ti (1) | hcp |  | -0.42 |
| Cu-Cu-Ti (2) | hcp |  | -0.40 |
| Cu-Ti-Ti | hcp |  | -0.81 |
| Cu-Cu-Ti (2) | hcp |  | -0.34 |
| Cu-Ti-Ti | hcp |  | -0.74 |
| Cu-Ti-Ti | hcp |  | -0.80 |

ELECTROCATALYST FOR HYDROGEN EVOLUTION AND OXIDATION REACTIONS

CROSS REFERENCE TO RELATED APPLICATIONS

This application claims priority benefit of U.S. Provisional patent application No. 62/023,202, filed on 11 Jul. 2014, the entirety of which is incorporated herein by reference for all purposes.

BACKGROUND OF THE INVENTION

The rising concerns about $CO_2$ emissions have led to a growing realization that it is not possible to sustain the world's current development based on fossil fuels without a substitution of clean and renewable energy. Hydrogen, in addition to being an important chemical feedstock in global industry, is now firmly considered as one of the most likely future fuels. However, current hydrogen production primarily relies on the steam methane reforming process which is neither sustainable nor favored because the process requires high energy (heat) input and produces $CO_2$ as a by-product. It is widely believed that room temperature electrochemical reduction of water to molecular hydrogen offers a significant promise for supplying $CO_2$-free hydrogen, which can be used directly as a fuel or as reactant to convert $CO_2$ and to upgrade petroleum and biomass feedstocks to value-added chemicals and fuels through hydrotreating processes. All these applications require large-scale, commercial processes for water electrolysis, which in turn require breakthrough discoveries in at least two areas: (1) the availability of electricity derived from renewable energy sources, such as solar and wind, and (2) the discovery of low-cost electrocatalysts to replace precious metals that are currently the state-of-the-art HER catalysts.

HER in an acidic environment generally requires lower overpotentials than those in a basic environment. However, a hydrogen production system in a basic environment is still more promising, because of the possibility to consider non-precious-metal based catalysts that cannot be used in acidic conditions, not only for HER at a cathode, but also for oxygen evolution reaction at an anode. Regardless of acidic or basic conditions, Pt, along with its alloys, is the benchmark electrocatalyst that requires very small overpotentials to drive the reaction, while the scarcity and high cost of Pt hinder its large-scale use for $H_2$ production. As a result, enormous research efforts have been devoted to finding and engineering low-cost alternative catalysts. For example, tungsten and molybdenum carbides and sulfides, nickel phosphides, and electrodeposited Ni—Cu alloy have been identified as potential electrocatalysts for HER, but unfortunately most of these catalysts exhibit poor intrinsic activity and/or stability in strong bases.

Over the past decade, density functional theory (DFT) predictions, in conjunction with experimental efforts, have played a pivotal role in providing design principles of electrocatalysts. For hydrogen evolution, the activities (in terms of exchange current density) of different catalytic surfaces can be correlated with their hydrogen binding energy (HBE) via a volcano-type relationship, revealing that an optimal HBE would lead to the highest activity. Monometallic catalysts have been studied extensively using the DFT method. However, monometallic non-precious metals show HBE values significantly different from that of Pt.

SUMMARY OF THE INVENTION

In some aspects, the invention provides a metallic alloy including Cu and one or more metals M selected from the group consisting of Ti, V, Cr, Mn, Fe, Co, Ni and Zn, wherein the alloy has a surface in the form of a vermiculated arrangement of irregular, nanoporous lands separated by troughs or channels.

In some aspects, the invention provides a method of making the foregoing metallic alloy. The method includes contacting a precursor alloy including Cu, M and Al with a caustic liquid under conditions sufficient to remove the Al from the precursor alloy.

In some aspects, the invention provides a water electrolyzer or a hydrogen fuel cell employing the foregoing alloy as a HER or HOR electrocatalyst, respectively.

In some aspects, the invention provides a metallic alloy including Cu and one or more metals M selected from the group consisting of Ti, V, Cr, Mn, Fe, Co, Ni and Zn, wherein the one or more metals M in total constitute in a range of 3 at. % to 7 at. %, relative to the total of Cu and M.

In some aspects, the invention provides a water electrolyzer or a hydrogen fuel cell employing the alloy immediately above as a HER or HOR electrocatalyst, respectively.

BRIEF DESCRIPTION OF THE DRAWINGS

FIG. 1a shows possible bimetallic sites on a Ti modified Cu surface according to the invention.

FIG. 1b shows a volcano plot of HBEs corresponding to the sites shown in FIG. 1a. The error bar stands for the variation of exchange current density in different experimental measurement.

FIG. 2a shows an SEM image of an $Al_{80}Cu_{19}Ti_1$ pristine catalyst electrode according to the invention.

FIG. 2b shows the corresponding XRD pattern relating to FIG. 2a.

FIGS. 2c-e show the corresponding EDX mapping of Cu (c), Al (d) and the composite Cu versus Al (e), respectively, relating to FIG. 2a.

FIG. 2f shows an SEM image of np-CuTi according to the invention.

FIG. 2g shows the corresponding higher magnification SEM image of the np-CuTi shown in FIG. 2f.

FIG. 4a shows HER activities for Pt/C, np-CuTi according to the invention, a Ti-free np-Cu control sample, and polycrystalline Cu standard in 0.1 M KOH electrolyte, respectively.

FIG. 4b shows the corresponding Tafel plots.

FIG. 7a shows HER polarization curves for bulk Cu and CuTi alloys according to the invention with Ti doping levels of 1, 3, and 5 at. %.

FIG. 7b shows HER polarization curves for bulk Ti and CuTi alloys according to the invention with Ti doping levels of 5, 7, and 9 at. %. All current densities are scaled with the surface roughness factor.

FIG. 8a shows $N_2$ adsorption/desorption isotherms for as-prepared np-CuTi according to the invention and its Ti-free np-Cu counterpart.

DETAILED DESCRIPTION OF THE INVENTION

Figures 1C, 1D:
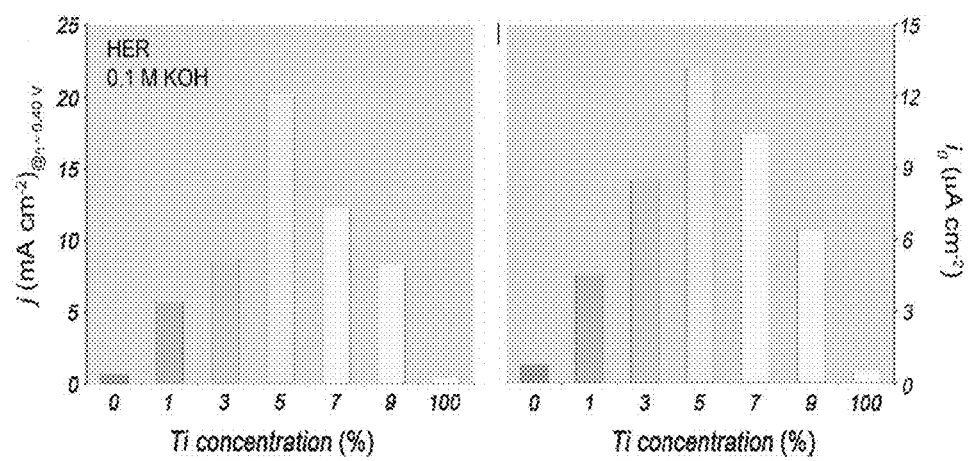
FIG. 1c shows a comparison of HER activities of various bulk CuTi alloy surfaces according to the invention with HER values of the corresponding monometallic standards.
FIG. 1d shows a comparison of exchange current densities of various bulk CuTi alloy surfaces according to the invention with those of the corresponding monometallic standards.

The invention provides robust and efficient non-precious metal catalysts for hydrogen evolution reaction (HER) and hydrogen oxidation reaction (HOR), and these catalysts can be used as electrocatalysts at the cathodes and anodes of water electrolyzers and hydrogen fuel cells, respectively. The catalysts are referred to herein as CuM catalysts or alloys, and are alloys of Cu and one or more metals M selected from the group consisting of Ti, V, Cr, Mn, Fe, Co, Ni and Zn. The CuM and np-CuM alloys are referred to herein as bimetallic because they include Cu and at least one other metal, but bimetallic alloys of the invention include ones in which more than one metal M is present. Some forms of the alloys, referred to as np-CuM alloys or catalysts, have a hierarchical nanoporous structure, and can be made by caustic leaching of Al from an Al-CuM precursor alloy.

The inventors have performed DFT calculations showing that CuTi bimetallic materials have similar hydrogen binding energy (HBE) values as Pt, and therefore are promising non-precious metal HER electrocatalysts. This has been experimentally verified on both bulk CuTi alloys and np-CuTi catalysts. Other CuM and np-CuM alloys can be made by the methods described herein for producing the CuTi and np-CuTi alloys, and these alloys also have utility as HER and/or HOR electrocatalysts in water electrolyzers and hydrogen fuel cells. Discussions of CuM and np-CuM alloys in the present disclosure relate largely to the preparation and evaluation of CuTi and np-CuTi, but it is to be understood that alloys using the other metals M may be used instead according to the invention.

The inventors have found that np-CuTi bimetallic electrocatalyst is able to produce hydrogen from water under a mild overpotential at a rate more than two times higher than that of the current state-of-the-art carbon-supported platinum catalyst. Although both Cu and Ti are known to be poor HER catalysts, their combination as described herein results in exceptional HER activity. Without wishing to be bound to any particular explanation, the inventors believe that the np-CuTi alloys comprise Cu—Cu—Ti hollow sites that have a hydrogen binding energy very similar to that of Pt, resulting in the exceptional HER activity. Additionally, the hierarchical porosity of the np-CuTi catalyst also contributes to its high HER activity, because it not only provides a large surface area for electrocatalytic HER, but also improves mass transport. Moreover, the np-CuTi catalyst is self-supported, eliminating the overpotential associated with the catalyst/support interface.

Bulk CuM and np-CuM Alloys

The bulk CuM alloys of the invention comprise M at a level of at least 1 at. % (atomic percent), or at least 2, 3 or 4 at. %, relative to the total of Cu and M, where M includes one or more of Ti, V, Cr, Mn, Fe, Co, Ni and Zn and the at.

% refers to the total of these present in the bulk material. The level of M is at most 15 at. %, or at most 10, 9, 8, 7 or 6 at. %. A preferred level is 5 at. %, especially when M consists of Ti alone. The balance is Cu. The bulk alloys can be produced by arc-melting followed by melt-spinning, so that they are in the form of a solid solution of M in Cu, or a phase of a compound of Cu and M, or a mixture of these. The bulk CuM alloys may consist of, or consist essentially of, Cu and Ti, or Cu and Ni, or Cu and Co.

The np-CuM alloys may be of the same elemental compositions on an atomic percent basis as the bulk alloys, based on the total of Cu and M, i.e., not counting any residual Al that might be present after caustic treatment of the Al-CuM precursor alloy. The caustic treatment is performed with a caustic liquid under conditions suitable to remove the Al. Suitable caustic liquids are aqueous bases, for example NaOH and KOH. The np-CuM alloys are in the form of a solid solution of M in Cu, or a phase of a compound of Cu and M, or a mixture of these.

The Al-CuM precursor alloys are multiphase alloys having an overall Al content of at least 50 at. %, or at least 55, 60, 65, 70 or 75 at. %. The Al content is at most 99 at. %, or at most 95, 90, 87 85 or 83 at. %. The balance is Cu and M, in any of the proportions described above with respect to the bulk CuM and np-CuM alloys. The Al-CuM precursor alloys may be prepared by arc-melting Al, Cu and M together.

Figure 2C:
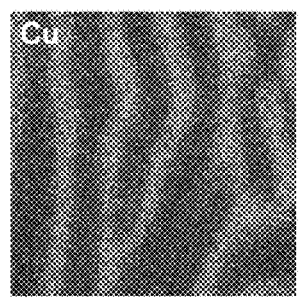
Figure 2D:
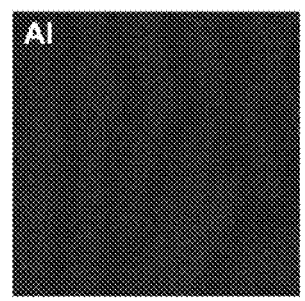
Figure 2E:
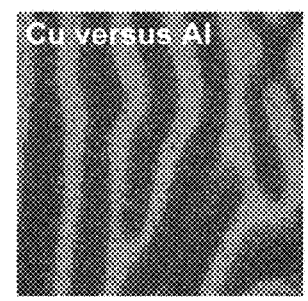

As seen in FIGS. 2$f$ and 2$g$, the surface of the np-CuM alloys may take the form of a folded, labyrinthine, maze-like, vermiculated, serpentine, brain-like, convoluted, Golgi-like or reticulum-like arrangement of irregular, nanoporous ridges or lands separated by troughs or channels, which hereinafter may be referred to simply as "a vermiculated arrangement," with the intention that the scope of such term includes any and all arrangements embodied by any one of the foregoing adjectives, to the extent any difference might otherwise be perceived between a structure characterized using one of them versus another. The ridges/lands and/or the troughs/channels may each individually have an average width in a range from 0.1 to 10 μm, or 0.1 to 5 μm, or 0.1 to 1 μm, or 0.1 to 0.5 μm, and the nanopores in the ridges/lands may have an average size of at least 2 nm, or at least 5 or 10 nm, using the Barrett-Joyner-Halenda (BJH) method. The average size may be at most 50 nm, or at most 30, 25 or 20 nm. The Brunauer-Emmett-Teller (BET) surface area of the np-CuM, as determined by $N_2$ adsorption-desorption measurement, may be at least 15 $m^2g^{-1}$, or at least 20, 25, 30, 35 or 40 $m^2g^{-1}$. The surface area may be at most 100 $m^2 g^{-1}$, or at most 80, 70, 60 or 50 $m^2g^{-1}$.

DFT Prediction of HER Activity of CuTi Catalyst

As monometallic catalysts, Cu and Ti are known to be poor HER catalysts because their HBE values are either too small or too large, respectively. Using DFT calculations, we have demonstrated that the Cu—Cu—Ti hollow site on a CuTi bimetallic surface exhibits an optimal HBE for HER. As shown in FIG. 1$a$, on a Ti modified Cu surface, three distinct adsorption sites can be identified. Their corresponding HBE values were calculated using DFT and were incorporated into a volcano plot constructed from previously studied monometallic surfaces (FIG. 1$b$). It can be seen that the two types of Cu—Cu—Ti hollow sites exhibit HBE values very close to that of Pt. In contrast, the Cu—Ti—Ti hollow site containing two Ti atoms binds hydrogen too strongly. Therefore, replacement of one surface Cu atom with Ti on every 3×3 Cu unit cell would result in an optimal surface, in principle achieving a maximum density of the Cu—Cu—Ti sites without introducing the Cu—Ti—Ti inactive sites. A lower or higher Ti content will decrease the HER activity due to insufficient number of active sites or creation of inactive sites. It should be noted that it was proposed recently that other than HBE, the binding of surface hydroxyl groups could be another descriptor of the catalytic activity for HER in base. While this finding may open a new horizon for designing HER catalyst, it also raised some different opinions regarding the effect of pH values. However, the results discussed herein suggest that the HBE appears to be an appropriate descriptor to predict HER activity for CuTi in a basic environment.

Experimental Verification of HER Activity of CuTi Catalyst

Figures 5A, 5B:
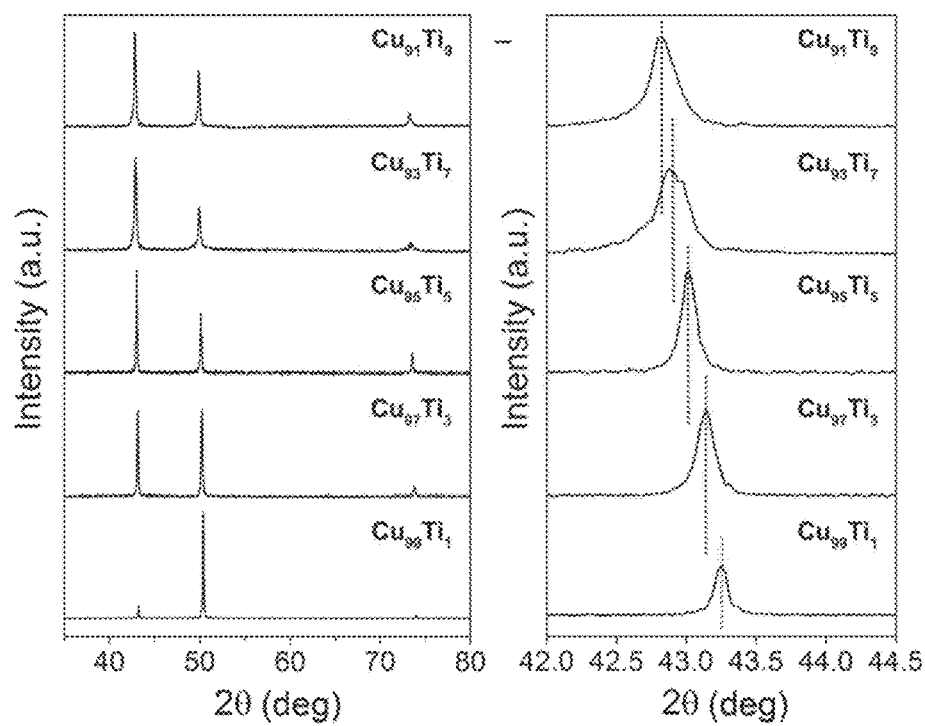
FIG. 5a shows full PXRD patterns for bulk CuTi alloys according to the invention.
FIG. 5b shows the enlarged Cu (111) peak region for bulk CuTi alloys according to the invention. All peaks were shifted towards to lower angular positions indicating a lattice expansion due to Ti modifications.
Figure 6A:
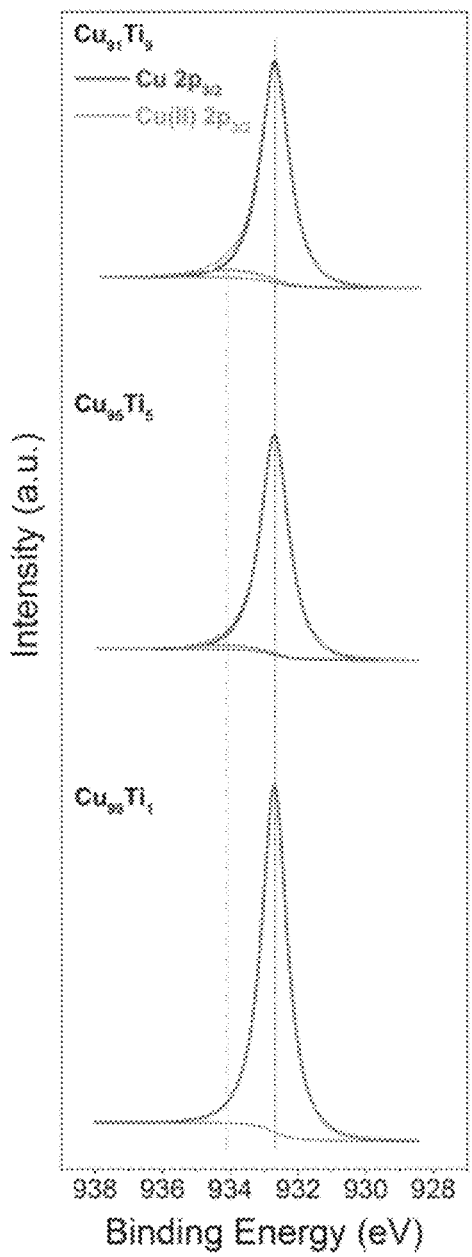
FIG. 6a shows XPS characterizations for Cu 2p spectra for bulk CuTi alloys according to the invention.
Figure 6B:
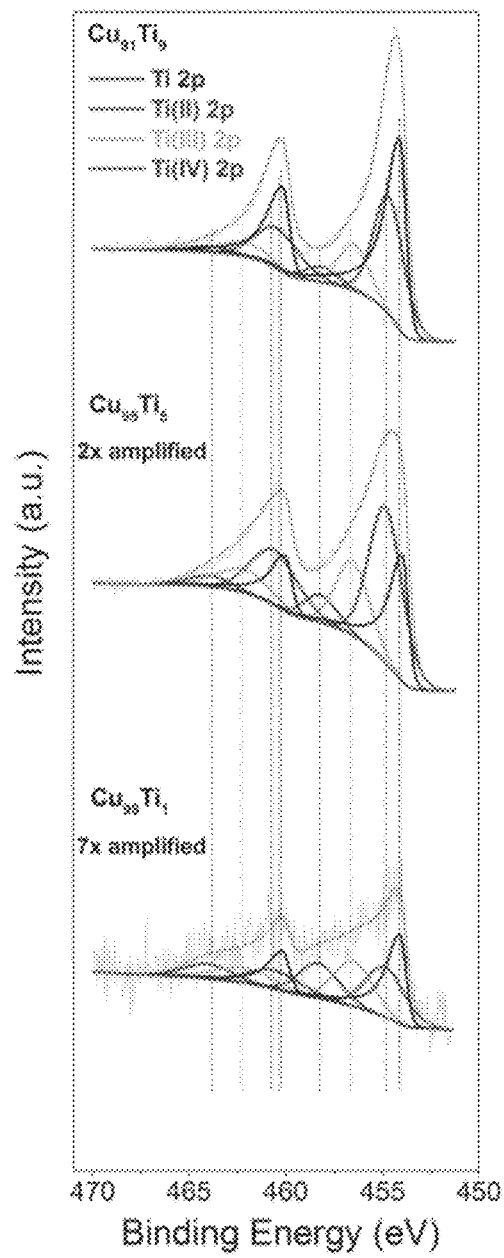
FIG. 6b shows XPS characterizations for Ti 2p spectra for bulk CuTi alloys according to the invention. Partial surface oxidation was observed in both Cu and Ti due to the handling of materials in atmospheric air.

To verify the DFT predictions, a series of $Cu_{100-x}Ti_x$ (x=1, 3, 5, 7, and 9) alloys with homogeneously distributed atoms was fabricated using an arc-melting technique followed by a melt-spinning process in order to retain their solid solution phase formed at high temperatures. After polishing, the resulting materials have smooth surfaces with roughness factor smaller than 1.1 (Table 1). Powder X-ray diffraction (PXRD) analysis suggests all alloys retain the fcc structure of crystalline Cu with a lattice expansion due to Ti doping (FIG. 5). It is well known that the elemental compositions of a bimetallic system can be different on the surface and in the bulk because the surface composition is determined as a result of minimization of alloy surface free energy with respect to atom exchange between surface and bulk. X-ray photoelectron spectroscopy (XPS) characterization was therefore conducted and the results (FIG. 6) confirmed that the surface Ti content is about twice as large as the bulk stoichiometry (Table 1).

TABLE 1

Summarized properties of bulk CuTi alloys, bulk Cu and Ti standards

| Materials | j (mA cm$^{-2}$)* | i$_0$ (μA cm$^{-2}$) | Tafel Slope (mV dec$^{-1}$) | Ti surface composition (%) | Roughness factor |
|---|---|---|---|---|---|
| Cu | 0.65 | 0.79 | 139 | 0 | 1.03 |
| Cu$_{99}$Ti$_1$ | 5.74 | 4.59 | 125 | 1.9 | 1.01 |
| Cu$_{97}$Ti$_3$ | 8.62 | 8.5 | 123 | 7.3 | 1.01 |
| Cu$_{95}$Ti$_5$ | 20.25 | 13.15 | 125 | 10.9 | 1.02 |
| Cu$_{93}$Ti$_7$ | 12.26 | 10.44 | 130 | 15.1 | 1.02 |
| Cu$_{91}$Ti$_9$ | 8.31 | 6.39 | 137 | 20.1 | 1.07 |
| Ti | 0.42 | 0.51 | 138 | 100 | 1.01 |

*The current densities were compared at overpotential of 0.4 V.

The HER activities of all CuTi alloys as well as pure Cu and Ti standards were compared by plotting their polarization curves in 0.1 M KOH electrolyte (FIG. 7). As shown in FIG. 1$c$, a significant increase in HER activity can be achieved after modifying the Cu surface with as little as 1 at. % of Ti, and a maximum enhancement was observed for a bulk stoichiometry of $Cu_{95}Ti_5$. The surface Ti composition of $Cu_{95}Ti_5$ is found to be 10.9 at. %, in good agreement with the optimal value predicted by DFT calculations of 1 Ti atom in a 3×3 cell (11.1 at. %). A further increase in Ti concentration leads to a decrease of HER activity, which is likely due to the rapid formation of Cu—Ti—Ti sites resulting from the large cohesive energy of Ti.

To extend the DFT predictions and bulk alloy results to practical high-performance catalysts, the inventors designed a nano-architecture for the catalytic material. The inventors wished to be able to operate electrolyzers at high reaction rates (i.e. high currents), a task made difficult by the possibility of the produced hydrogen bubbles building up inside the porous network and blocking the active sites. The inventors have addressed this by providing a CuTi electrocatalyst with a highly hierarchical porous structure (denoted as np-CuTi) by dealloying a multi-phase Al—CuTi precursor alloy (atomic ratio Al:Cu:Ti=80:19:1) to remove Al via caustic leaching. The atomic ratio of Ti to (Cu+Ti) was chosen to be the optimal value (5 at. %) from bulk CuTi studies. The nano-sized pores of the resulting np-CuTi are responsible for high surface areas, whereas the micron-sized pores served as gas diffusion channels to enhance mass transport properties. This catalyst is monolithic and self-supported, which enhances the electric transportation and eliminates the necessity of using a supporting conductive substrate.

Structural Analysis of np-CuTi

The origin of the hierarchical porosity was explored using various structural characterizations. A typical scanning electron microscopy (SEM) image of an $Al_{80}Cu_{19}Ti_1$ plate is presented in FIG. 2a (scale bar 1 μm), showing two distinctly contrasted phases. The dimension of each phase, either bright or dark, is about several hundred nanometers in width and extends to several micrometers in length. EDX analysis (FIG. 2c-e) clearly shows that the bright region is a Cu-rich phase, while the darker region is mainly composed of Al. The location of Ti atoms cannot be determined by EDX measurements because of its low atomic concentration (1%).

Figure 8B:
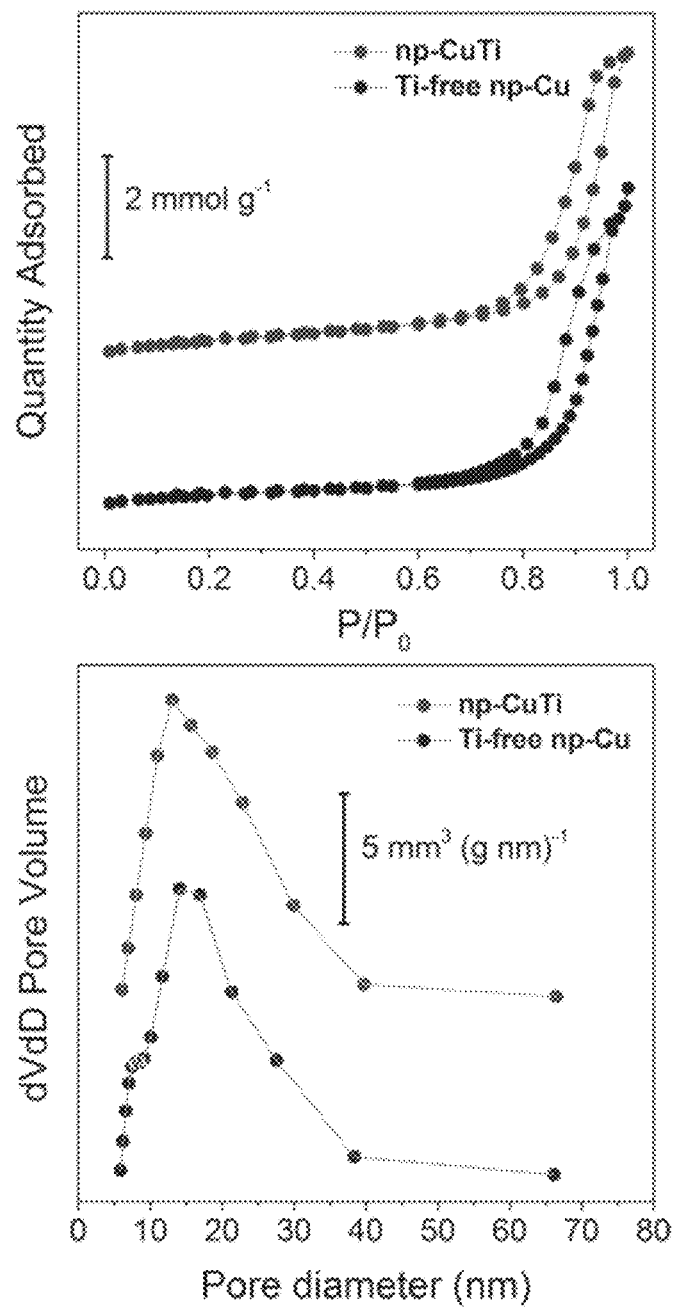
FIG. 8b shows the corresponding pore size distributions derived from desorption isotherms using the BJH method. Both materials exhibited near-identical specific surface areas (46 $m^2$ $g^{-2}$ for np-CuTi; 45 $m^2$ $sg^{-2}$ for Ti-free np-Cu) and pore size distributions.

The PXRD pattern in FIG. 2b shows two sets of distinct diffraction profiles, corresponding to $Al_2Cu$ and Al. The angular positions of the indexed $Al_2Cu$ peaks matched the calculated values of the standardized crystal structure, whereas the Al peaks were found to be slightly shifted towards lower angles, indicating a possible crystal lattice expansion due to Ti doping. Additionally, a weak $Al_3Ti$ peak (112) (2θ=39°) was also observed. The PXRD results indicate the existence of Ti in the Al-rich region in two phases: an Al—Ti solid solution phase and a metallic $Al_3Ti$ compound phase. The subsequent selective dealloying process conducted in strong alkaline media to remove Al resulted in two different sets of pores in np-CuTi (FIG. 2f, scale bar 1 μm, and FIG. 2g, scale bar 200 nm. The micron-size pores were resulted from a complete removal of the Al rich region; the nano-sized pores were obtained by the removal of Al atoms in the $Al_2Cu$ compound. $N_2$ adsorption-desorption measurement further confirmed that the resulting np-CuTi exhibits a relatively large Brunauer-Emmett-Teller (BET) surface area of about 46 $m^2\ g^{-1}$ with an average nanopore size of ca. 15 nm using the Barrett-Joyner-Halenda (BJH) method (FIG. 8). Note that the micron-sized pores in np-CuTi are too large to be measured in the gas adsorption experiments.

Figure 3A:
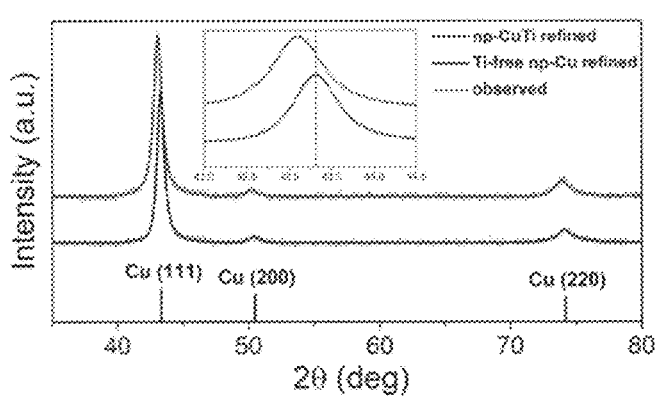
FIG. 3a shows the XRD patterns of np-CuTi according to the invention and Ti-free np-Cu. Inset: The enlarged region of Cu (111) diffraction peaks, with the dotted line indicating the peak position of pure Cu.
Figures 9A, 9B:
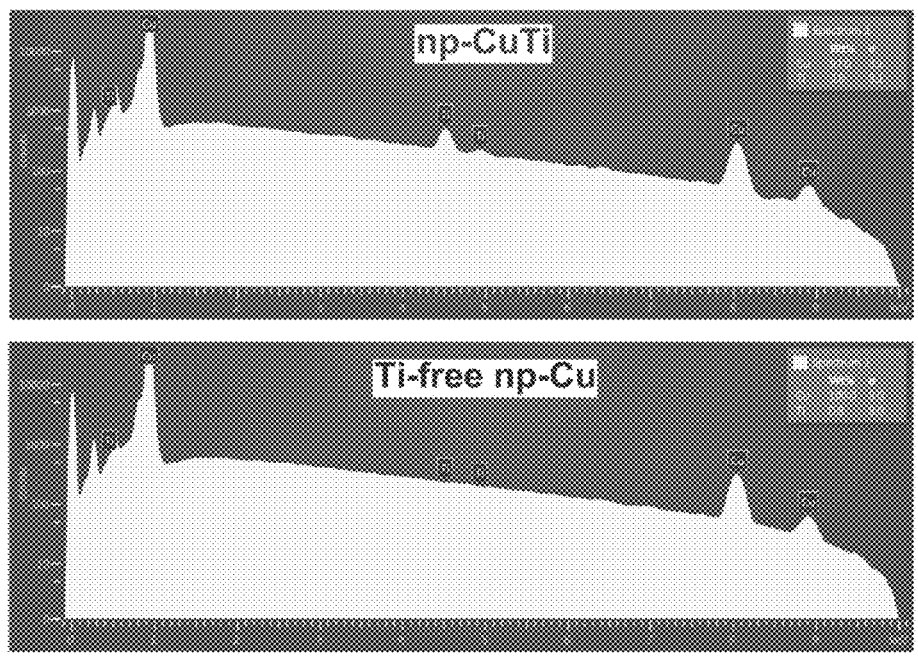
FIG. 9a shows an EDX spectrum of np-CuTi according to the invention, showing a Ti concentration of about 3 wt. % (ca. 5 at. %).
FIG. 9b shows an EDX spectrum of the acid-treated material, showing no detectable Ti content.
Figure 10A:
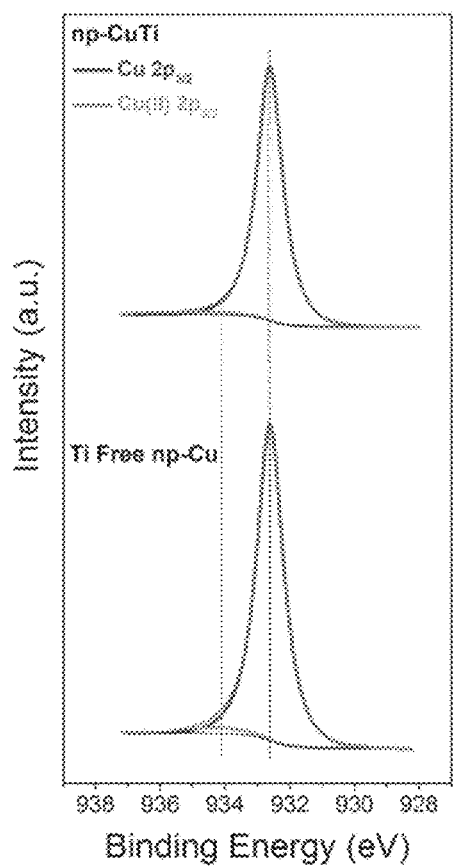
FIG. 10a shows Cu 2p XPS characterizations for np-CuTi according to the invention and Ti-free np-Cu.
Figure 10B:
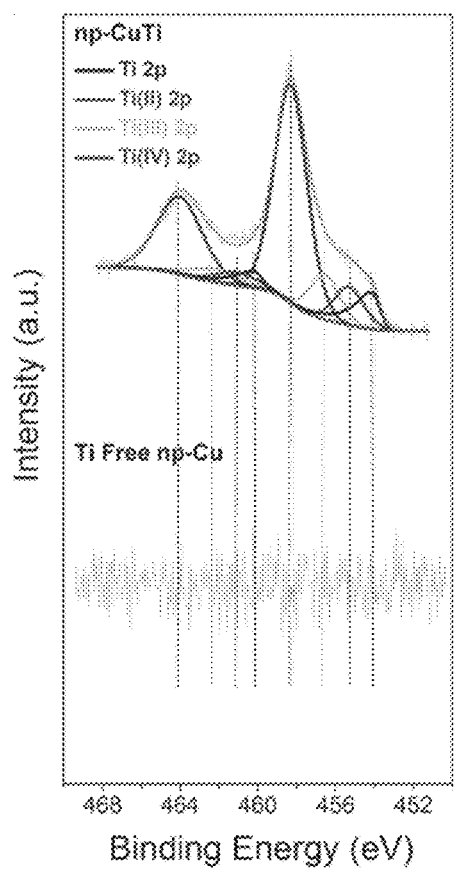
FIG. 10b shows Ti 2p XPS characterizations for np-CuTi according to the invention and Ti-free np-Cu. The surface conditions and surface Ti composition of np-CuTi is similar to that of bulk $Cu_{95}Ti_5$ (12.7% for np-CuTi; 10.9% for $Cu_{95}Ti_5$). Partial surface oxidation was observed in both Cu and Ti due to the handling of materials in atmospheric air, similar to that seen in bulk materials.

The PXRD data for np-CuTi (FIG. 3a) suggested a similar crystal structure with that of the bulk CuTi alloys. A small unit cell expansion (Table 2) was also observed due to Ti substitution. The atomic ratio of Ti to (Cu+Ti) of np-CuTi was verified to be about 5 at. % by energy-dispersive X-ray spectroscopy (EDX) analysis (FIG. 9), mimicking the optimal composition of $Cu_{95}Ti_5$ from the bulk CuTi alloy study. The consistency in their surface conditions was also confirmed using XPS characterizations (FIG. 10).

Figure 3B:
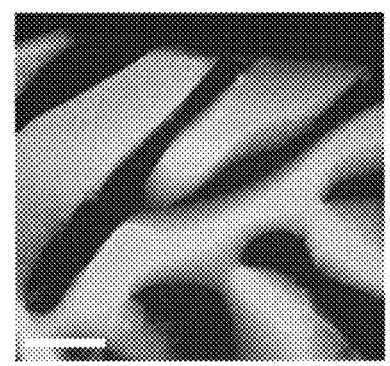
FIG. 3b shows the high angle annular dark field (HAADF) scanning (S)TEM image of a cross-sectioned np-CuTi sample according to the invention, using the FIB technique.
Figure 3C:
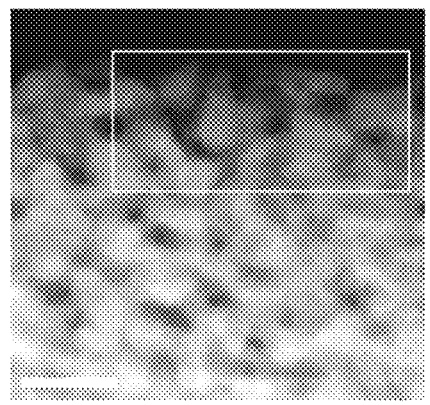
FIG. 3c shows an HAADF STEM image with a higher magnification. The box indicates the region selected for EELS study.

To further study the structure of np-CuTi, transmission electron microscopy (TEM) characterization was performed on a cross-sectioned specimen prepared using a focused ion beam (FIB) technique. High-angle annular dark-field (HAADF) TEM image again confirmed the bimodal porous nature of np-CuTi (FIG. 3b, scale bar 1 μm). The high magnification image, FIG. 3c (scale bar 50 nm), clearly shows that the material ligaments and nanopores are similar in size (ca. 15 nm), in good agreement with the grain size estimated from PXRD data using the Scherrer's method (Table 2) and the pore size observed in $N_2$ adsorption-desorption analysis (FIG. 8).

TABLE 2

Lattice parameter and grain size estimated from PXRD pattern for np-CuTi, Ti-free np-Cu, and their comparison to theoretically constructed $Cu_{95}Ti_5$ and Cu standard

| Materials | a (Å) | b (Å) | c (Å) | V (Å³) | Grain size (nm) |
|---|---|---|---|---|---|
| np-CuTi | 3.636 | 3.636 | 3.636 | 48.07 | 13.8 |
| Ti-free np-Cu | 3.616 | 3.616 | 3.616 | 47.27 | 14.4 |
| Constructed $Cu_{95}Ti_5$ | 3.634 | 3.634 | 3.634 | 48.00 | N/A |
| Cu standard | 3.615 | 3.615 | 3.615 | 47.24 | N/A |

Figure 3D:
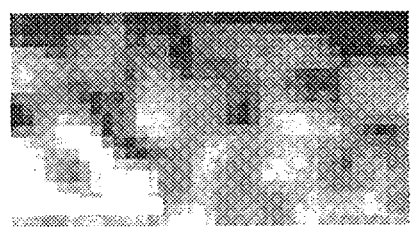
FIGS. 3d-f show contrast images of the selected region for an EELS mapping study and the corresponding Cu (e) and Ti (f) maps, respectively.
Figure 3E:
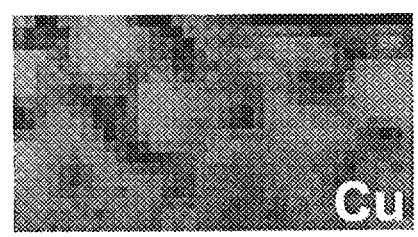
Figure 3F:
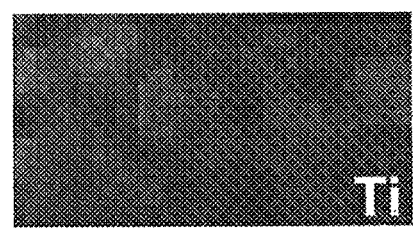
Figure 3G:
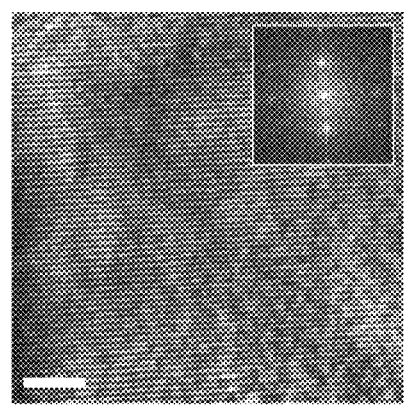
FIG. 3g shows a high resolution TEM image with visible lattice fringes. Inset: The Fourier transform confirms that np-CuTi is composed of an extended crystalline network.

The np-CuTi catalyst was also examined using electron energy loss spectroscopy (EELS). While FIG. 3d (scale bar 50 nm) shows the contrast image of a selected region for spectroscopic evaluation, FIGS. 3e and 3f (scale bar 50 nm) show the associated Cu and Ti EELS mappings using the $L_{2,3}$ edge of Cu and Ti, respectively. It is evident that Cu and Ti atoms are homogeneously distributed along the material ligaments, consistent with the conclusion of a solid solution from the PXRD results. Moreover, near-edge fine structure analysis confirmed the metallic nature of Cu and Ti. No oxygen K-edge signal was detected in the EELS spectra. High resolution TEM (HRTEM) image exhibits uniform lattice fringes (FIG. 3g, scale bar 2 nm), further confirming the highly crystalline nature of np-CuTi.

Electrocatalytic Activity of np-CuTi

Figures 11A, 11B:
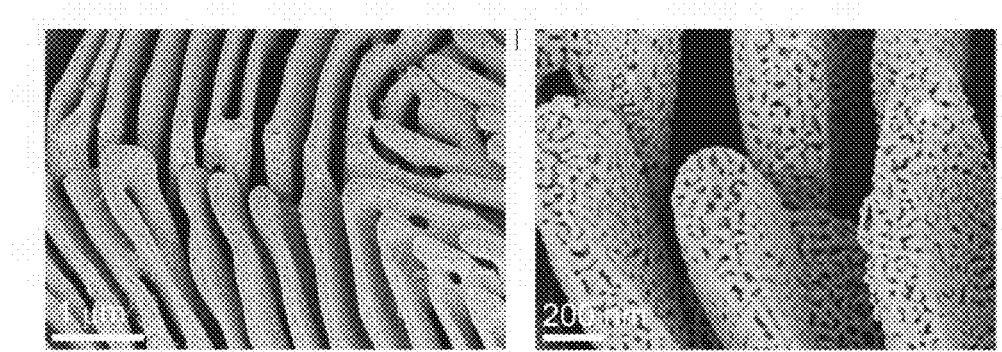
FIG. 11a shows an SEM image of Ti-free np-Cu at low magnification.
FIG. 11b shows an SEM image of Ti-free np-Cu at higher magnification.

The electrocatalytic performances of np-CuTi were evaluated and compared to a commercial state-of-the-art Pt/C electrocatalyst. FIG. 4a shows the HER polarization curves of normalized current densities versus applied potential (iR corrected). The activity of the np-CuTi catalyst exceeded Pt/C steadily with a more than two-fold enhancement, most likely owing to its highly active surface, large surface area, and enhanced mass transport properties. In order to prove the high activity of Cu—Cu—Ti sites on the internal np-CuTi surface, a Ti-free nanoporous Cu with identical hierarchical porous structure (denoted as np-Cu) was synthesized by introducing one additional dealloying process using aqueous $H_2SO_4$ solution to remove the Ti from np-CuTi. Structural characterization results confirmed that the structure of the resulting material was nearly identical to that of np-CuTi in terms of morphology (FIG. 11), pore size distribution and specific surface area (FIG. 5), but no Ti was detected by EDX (FIG. 9) or XPS (FIG. 10) analysis. More importantly, the X-ray diffraction peaks of np-Cu were shifted towards higher angles compared with those of np-CuTi and aligned precisely with the peak positions of pure Cu (FIG. 3a), indicating a successful removal of Ti atoms with a concomitant lattice contraction (Table 2).

Figure 12:
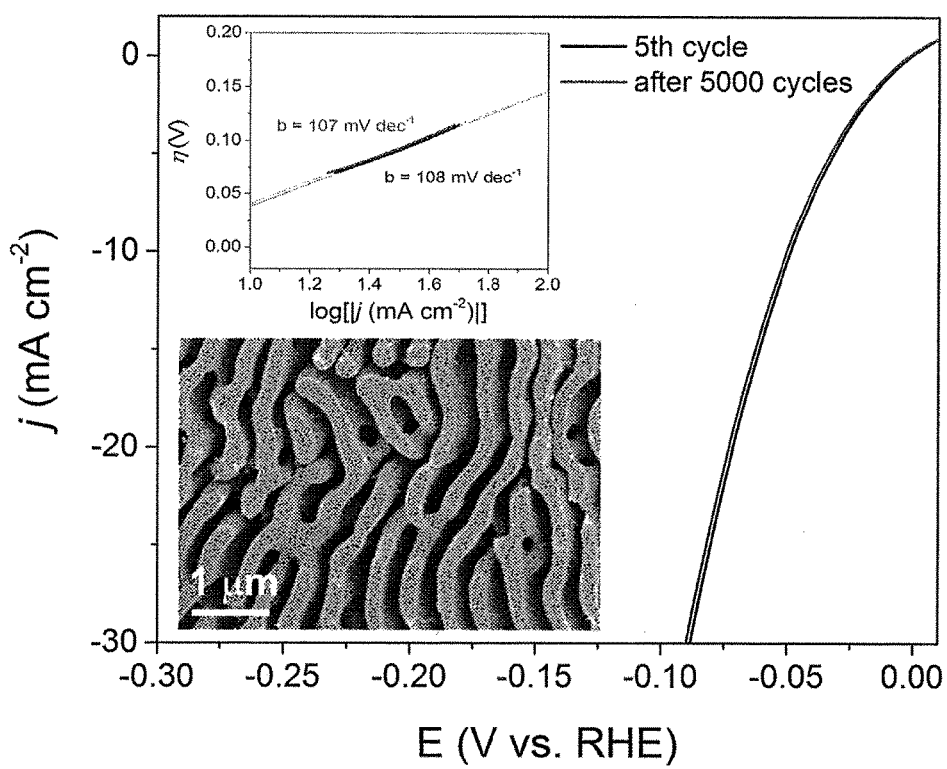
FIG. 12 shows HER polarization curves of np-CuTi according to the invention at the 5th cycle and after 5000 cycles with a scanning rate of 0.5 mV $s^{-1}$. The cycles in between were scanned at 25 mV $s^{-1}$. Inset: The corresponding Tafel plots (upper panel) and the morphology after 5000 cycles (lower panel).
Figure 13A:
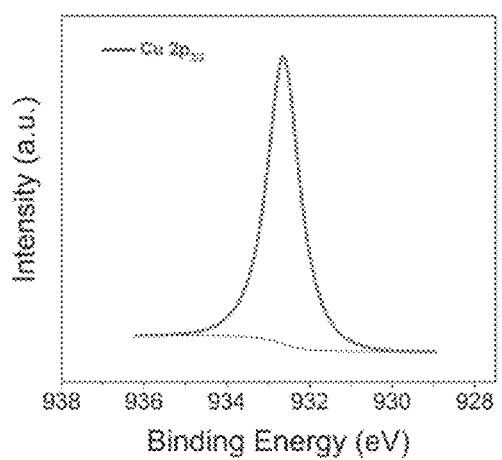
FIG. 13a shows XPS spectra in the Cu 2p region of the np-CuTi sample referred to in FIG. 12 after 5000 cycles.
Figure 13B:
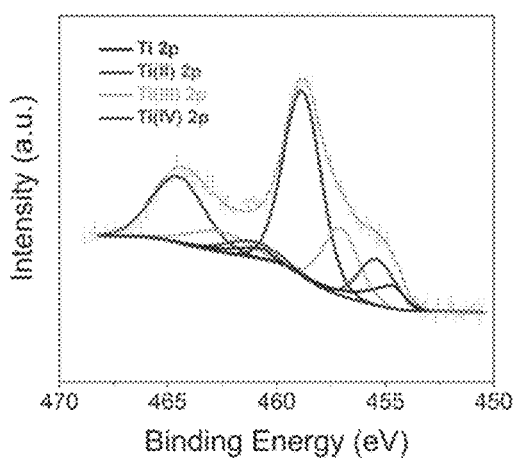
FIG. 13b shows XPS spectra in the Ti 2p region of the np-CuTi sample referred to in FIG. 12 after 5000 cycles. The surface condition of Ti is similar to that of an as-prepared sample. Partial surface oxidation was again observed, most likely due to the handling of materials in atmospheric air, similar to that seen in bulk materials.

As expected, the HER activity of the Ti-free np-Cu sample, although sharing a similar hierarchical porous structure, decreased by a factor of more than 50. Although increasing the active specific surface area by providing smaller surface features can lead to enhanced HER activity, as seen by the much higher HER activity of np-Cu vs. that of bulk Cu (FIG. 4a), such an enhancement is not the dominant reason of the unique HER activity of np-CuTi. Based on the electrocatalysis results for both np-Cu and bulk polycrystalline Cu, it can be concluded that the exceptional HER activity observed in the np-CuTi sample (FIG. 4a) is due to the combination of the active Cu—Cu—Ti surface sites and the hierarchical porous structure. The long term stability of np-CuTi catalyst was also examined with an extended reaction period of 5000 potential cycles, in which both the electrochemical performance and material structure remained remarkably stable (FIG. 12 and FIG. 13).

Tafel Analysis of np-CuTi

Under alkaline conditions, HER proceeds in the following sequences of either Volmer-Heyrosky or Volmer-Tafel mechanisms:

Volmer step: $H_2O + e^- + * \leftrightarrow H_{ad} + OH^-$ (1)

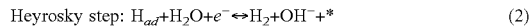

Heyrosky step: $H_{ad} + H_2O + e^- \leftrightarrow H_2 + OH^- + *$ (2)

Tafel step: $2H_{ad} \leftrightarrow H_2 + 2*$ (3)

where * represents the hydrogen adsorption sites. Literature reports indicate that the Volmer step is the rate-limiting step for HER on Pt/C in alkaline conditions, leading to a Tafel slope of about 120 mV dec$^{-1}$. Therefore a Tafel analysis of np-CuTi was performed in an attempt to gain insights into the kinetics of HER. The linear portions of the Tafel plots were fitted to the Tafel equation ($\eta$=b log|j|+a) and yielded the Tafel slope (b) (FIG. 4b). As shown in FIG. 4b, the np-CuTi catalyst exhibits a Tafel slope of 110 mV dec$^{-1}$ (q=70-115 mV), very close to the value of Pt/C (111 mV dec$^{-1}$, $\eta$=85-120 mV).

It is worth noting that partial surface oxidation of both Cu and Ti was observed from np-CuTi (FIG. 10). Although the HER is known to provide a highly reductive environment, the exact surface chemical nature of np-CuTi under reaction conditions was not clear due to the lack of in situ methods capable of resolving the valence state of surface atoms in the potential region of HER and the limitation of ex situ measurement (i.e. extensive exposure of samples to air). It is likely that the electrode surface is not completely metallic and the Ti atoms may also be in an oxidized state of $Ti^{3+}$ or $Ti^{4+}$ irrespective of contact of oxygen. It has been reported that oxophilic groups, such as non-precious metal hydroxides, are able to aid metallic catalysts during their HER processes in alkaline due to their ability to break the O—H bond. Therefore, it is possible that un-reduced surface oxides (if present) of np-CuTi would facilitate the HER in a similar manner, and therefore could contribute to enhanced HER activity.

Electrolyzers and Fuel Cells Using np-CuM Electrocatalysts

Figure 16:
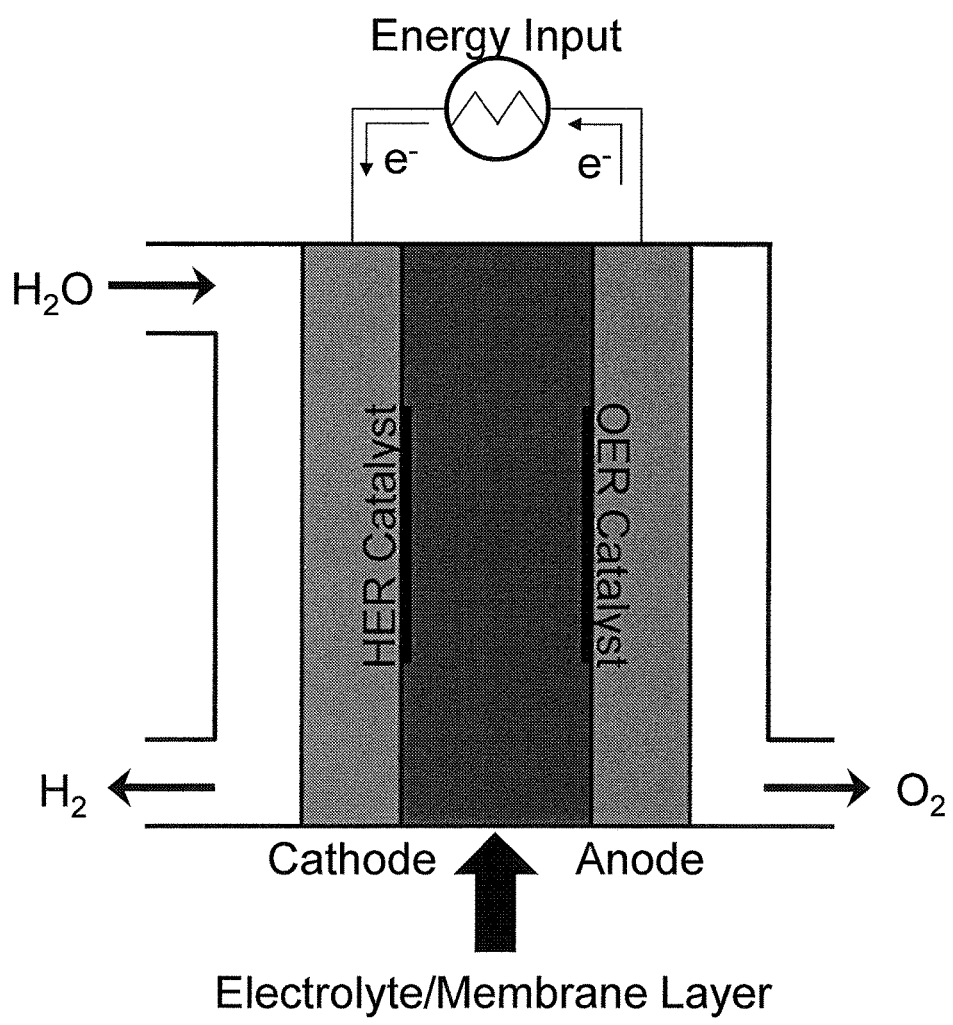
FIG. 16 is a schematic representation of a water electrolyzer using a CuTi or np-CuTi alloy according to the invention as a HER catalyst according to the invention.
Figure 17:
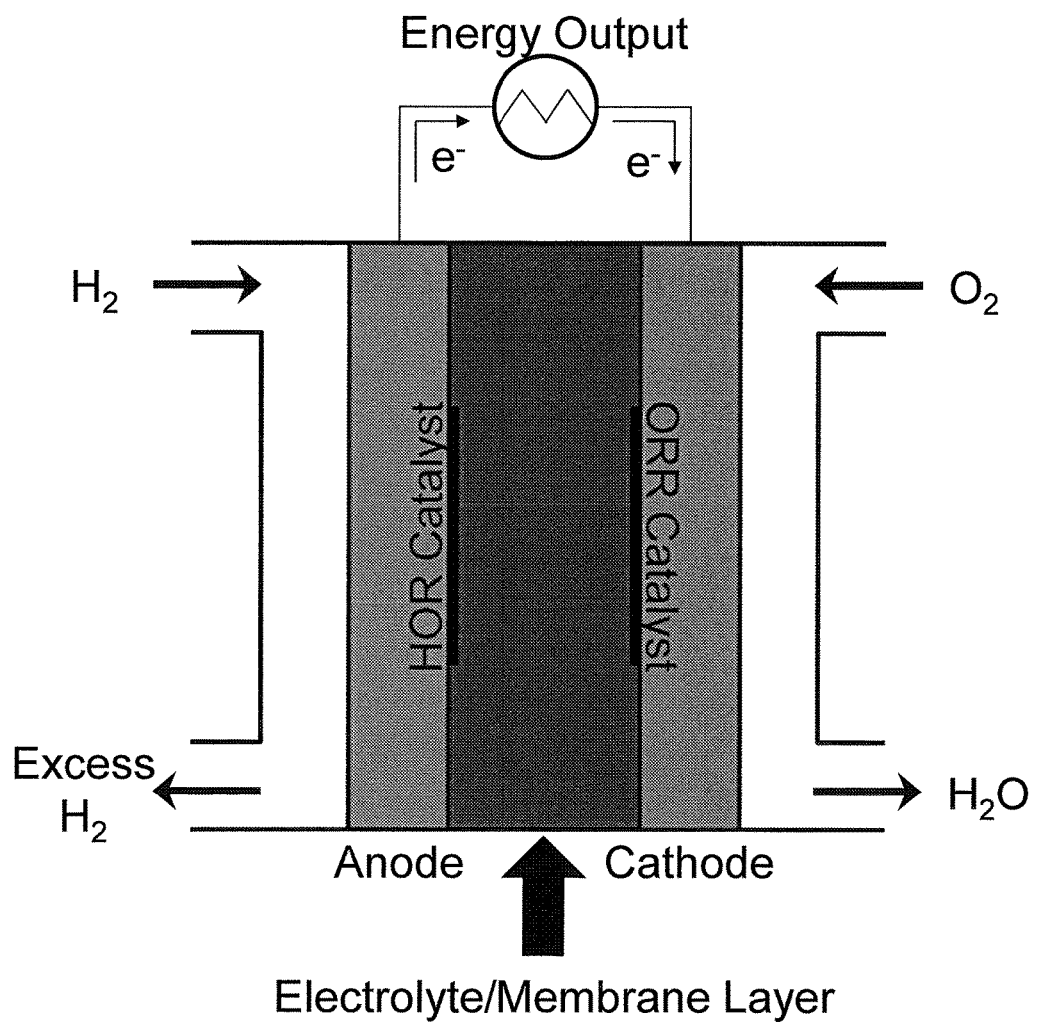
FIG. 17 is a schematic representation of a hydrogen fuel cell using a CuTi or np-CuTi alloy according to the invention as a HOR catalyst according to the invention.

In some embodiments of the invention, np-CuM alloys or bulk CuM alloys may be used as the cathodic electrocatalyst to facilitate HER in a water electrolyzer, for example one using a hydroxide exchange membrane. Analogously, the np-CuM alloys or bulk CuM alloys may serve as anodic electrocatalysts to facilitate HOR in hydrogen fuel cells, for example those using hydroxide exchange membranes. Numerous configurations and methods of making water electrolyzers and hydrogen fuel cells are known to the skilled person, and the np-CuM alloys of the invention may be used as electrocatalysts in any of these. Schematic representations of an electrolyzer and a fuel cell are shown in FIGS. 16 and 17, respectively. In these drawings, HER refers to hydrogen evolution reaction, OER refers to oxygen evolution reaction, HOR refers to hydrogen oxidation reaction, and ORR refers to oxygen reduction reaction. Suitable OER and ORR catalysts are known to the skilled person.

EXAMPLES

DFT Calculations

Figure 15:
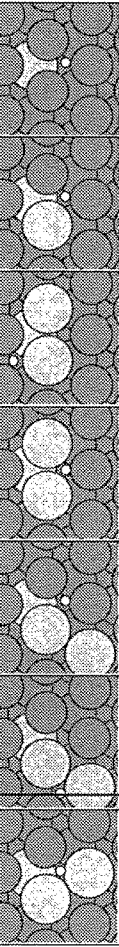
FIG. 15 shows the effect of including a Ti atom in the sublayer of a CuTi or np-CuTi alloy on the calculated HBE value.
Figure 15:
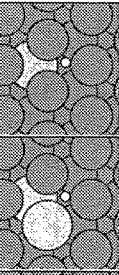
Figure 15:
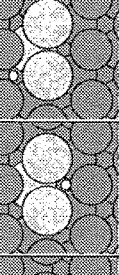
Figure 15:
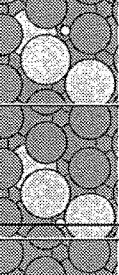
Figure 15:
Figure 15:
Figure 15:

The DFT calculation of HBE was performed with the Vienna Ab initio Simulation Package (VASP). The PW-91 functional was used in the generalized gradient approximation (GGA) calculation, and a kinetic cutoff energy of 396 eV was used for the plane wave truncation. A periodic 3×3 unit cell with a 3×3×1 Monkhorst-Pack k-point grid was used for all calculations. All surfaces were modeled by adding six equivalent layers of vacuum onto four layers of metal atoms corresponding to the most close-packed configurations. The two bottom layers of the slab were fixed at a distance of 2.59 Å while the top two layers were allowed to relax to reach the lowest energy configuration. Spin-polarization was included for both surfaces. The binding energy was calculated using the equation:

$$E_{atomic}^{H} = E_{H\text{-}slab} - E_{slab} - 0.5 \times E_{H_2(g)}$$

where $E_{atomic}^{H}$ is the binding energy of atomic hydrogen on the given slab, $E_{H\text{-}slab}$ is the energy of the surface with 1/9 ML hydrogen adsorbed, $E_{slab}$ is the energy of the slab in a vacuum, and $E_{H_2(g)}$ is the energy of hydrogen in the gas phase. Different adsorption sites, such as atop, bridge, fcc and hcp, were calculated. The hcp sites always yield the lowest adsorption energy, indicating they are the most stable binding site and their values are included in FIG. 1b. The inclusion of a Ti atom in the sublayer of the model only slightly affects the calculated HBE value and does not influence the HBE trend (FIG. 15), where the geometry at the relaxed state is provided for each case (H=white, Ti=light, Cu=dark).

Materials

The $Cu_{100-x}Ti_x$ (x=1, 3, 5, 7, and 9) alloys with nominal compositions were prepared by arc melting pure Cu (Alfa Aesar, 99.999%) and Ti (Alfa Aesar, 99.99%) under an argon atmosphere. In a subsequent step, a melt spinning technique was introduced to re-melt the alloy ingot and rapidly quench on the surface of a spinning metal roller (50 m/s) to achieve a homogeneous Cu(Ti) solution phase (FIG. 5). The resulting alloy materials were in a ribbon form with a dimension about 3 mm wide and 0.5 m long. After their compositions were verified using energy dispersive X-ray spectroscopy, the alloy ribbon surfaces were polished using 0.1 μm, 0.05 μm and 0.01 μm size alumina particles (Buehler) in sequence. Electrodes for electrochemical testing were fabricated by attaching one end of those alloy ribbons with copper wire (Alfa Aesar, 99.999%) as the current collector using silver paint (SPI Supplies). The apparent electrode size used for hydrogen evolution test is about 0.30 cm$^2$. For the preparation of Pt/C catalyst electrode, 10 mg commercial Pt/C catalyst (TKK, 48.8 wt %) was dispensed in 20 mL DI water. After a rigorous sonication of 30 minutes in a water/ice mixture bath, 15 μL of the suspension was deposited onto a glassy carbon electrode (0.20 cm$^2$) and was dried in air to form a uniform thin film for electrochemical characterizations.

To synthesize hierarchical porous CuTi catalyst, an Al—CuTi precursor alloy was first prepared by arc melting pure Al (Alfa Aesar, 99.99%), Cu (Alfa Aesar, 99.999%) and Ti (Alfa Aesar, 99.99%) at an atomic ratio of 80:19:1 Al:Cu:Ti under an argon atmosphere. After verifying the composition by energy dispersive X-ray spectroscopy, the resulting alloy ingot was cut into thin plates with dimensions of 10 mm×5 mm×0.20 mm using a precision wafering machine. Surface rust was removed using 240 Grit sandpaper, and the surface was further polished using finer grade sandpapers (600 Grit and 1200 Grit). A copper wire, which served as the current collector, was connected to one end of the alloy plate using spot welding. In a following step, the pristine electrodes were immersed in a 6 M KOH solution to remove Al, thereby forming hierarchical porous CuTi (np-CuTi). Ti was removed from a sample of the np-CuTi catalyst by immersing in a 0.05 M $H_2SO_4$ solution until gas bubbles stopped forming. All catalysts were rinsed in DI water multiple times and subjected to electrochemical evaluations directly without drying. The apparent electrode size of hierarchical porous catalysts used for the hydrogen evolution test was about 0.50 $cm^2$.

Structural Characterization

Powder X-ray diffraction patterns were collected using a Rigaku Ultima IV X-ray diffractometer with Cu Kα radiation. The porous material samples were assembled in an Ar filled glove box with a Mylar film (Chemplex, 2.5 µm thick) mounted on the surface for preventing severe oxidation. Refinement of the PXRD patterns was conducted using the Rietveld approach implemented in Rigaku's software package PDXL.

Scanning electron microscopy studies were performed with a ZEISS CrossBeam Auriga 60 FIB-SEM. The high resolution TEM (bright field) image and HAADF (high angle annular dark field) image were taken by 200 kV FEI F20 UT Tecnai with spatial resolution of 0.14 nm and an energy resolution of EELS of 0.6 eV without a monochromator. The energy dispersion for EELS mapping was set to 0.3 eV/channel and the acquisition time for each spectrum was set at 1.2 seconds to achieve a useful signal for Ti, Cu and O. In order to obtain high spatial resolution for EELS, the total acquisition time for each map was set to be at least 40 minutes which corresponds to around 1200 pixels with drift correction. The EELS mappings were extracted from each target element's peak independently, and do not reflect the relative proportion between Cu and Ti.

Figure 14A:
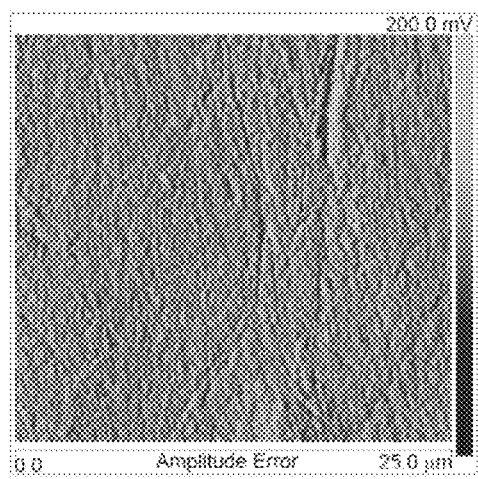
FIGS. 14a-c shows typical AFM images of the surface of a bulk CuTi alloy according to the invention with respect to amplitude (a), phase (b), and height (c).
Figure 14B:
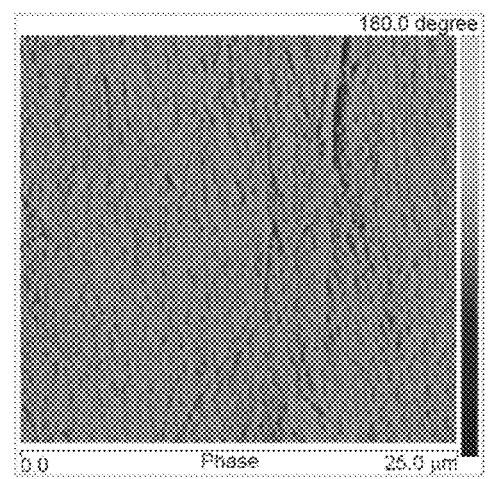
Figures 14C, 14D:
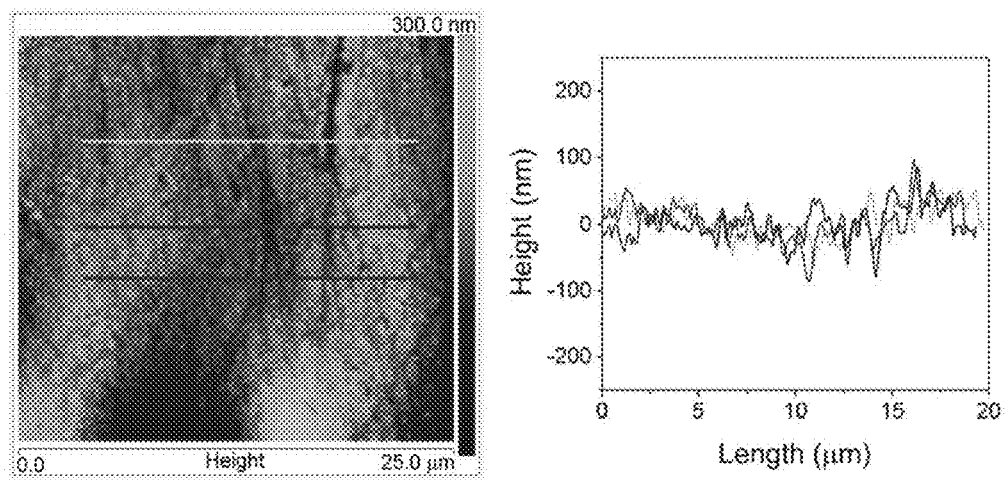
FIG. 14d shows line scans of the height fluctuations for the three lines indicated in FIG. 14c.

The cross-sectioned TEM sample was prepared with the ZEISS CrossBeam Auriga 60 FIB-SEM. The porous material was embedded in M-Bond 610 Adhesive System (SPI Supplies) for improving mechanical properties prior to the FIB preparation. The surface roughness factors of bulk CuTi alloys were characterized using an atomic force microscopy (Dimension 3100, Veeco instruments Inc.) in tapping mode (FIG. 14). Six different areas (25 um×25 um) were randomly selected for each samples and were analyzed with same scan parameters and same scan rate of 1 Hz. The roughness factors listed in Table 1 were the average value from six different measurements.

An X-ray photoelectron spectroscopy system (Physical Electronics VersaProbe 5000) was used to analyze the surface. The system was equipped with a 16 channel hemispherical analyzer and Al anode monochromatic X-ray source. The binding energy scale was calibrated by comparing the position of the primary photoelectron peaks in Cu, Au, and Ag reference foils to values in literature. Data were analyzed using CasaXPS software, and peaks were fit using a Gaussian/Lorentzian product line shape and Shirley background. $N_2$ adsorption/desorption isotherms were collected at 77 K by using a Micromeritics ASAP 2020.

Electrochemical Evaluation

A typical three-electrode cell equipped with an Ag/AgCl reference electrode (3.0 M KCl, BASi) was used for hydrogen evolution reaction studies. A graphite rod (Sigma-Aldrich, 99.999%) was used as counter electrode for testing CuTi samples. A piece of Pt wire was used as counter electrode for testing Pt/C samples. The electrolyte was 0.1 M KOH (Sigma-Aldrich, 99.99%) made with MilliQ water (18.2 MΩ) and was continuously purged with $N_2$ (Keen, 99.999%). The reference electrode was calibrated to the reversible hydrogen potential using platinum wires for both working and counter electrodes in the same electrolyte purged with $H_2$ (Keen, 99.999%). The calibration resulted in a shift of −0.974 V versus the RHE. The sweep rates used in the cyclic voltammetry studies were 5 mV $s^{-1}$ for bulk materials and Pt/C; 0.5 mV $s^{-1}$ for porous materials in order to suppress the capacitive current due to their high surface area. All experiments were conducted using a Princeton Applied Research VersaSTAT 3 potentiostat and were performed at room temperature.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A metallic alloy comprising Cu and one or more metals M selected from the group consisting of Ti, V, Cr, Mn, Fe, Co, Ni and Zn, the alloy having a hierarchical porous structure comprising a microporous structure and a nanoporous structure,
    wherein the microporous structure is defined by the alloy having a surface in the form of a vermiculated arrangement of irregular, nanoporous lands or ridges separated by troughs or channels,
    wherein the nanoporous structure is defined by the nanopores in the nanoporous lands or ridges, and
    wherein the metallic alloy is self-supported.

2. The metallic alloy of claim 1, wherein M comprises Ti.

3. The metallic alloy of claim 1, wherein M comprises Ni.

4. The metallic alloy of claim 1, wherein M comprises Co.

5. The metallic alloy of claim 1, wherein the alloy consists of Cu and Ti.

6. The metallic alloy of claim 1, wherein a total amount of the one or more metals M is in a range of 1 at. % to 15 at. %, and Cu is in a range of 85 at. % to 99 at. %, based on the total amount of Cu and M.

7. The metallic alloy of claim 1, wherein the alloy further comprises Al.

8. The metallic alloy of claim 1, wherein the alloy consists of Cu, Ti and Al.

9. A water electrolyzer comprising a cathode employing the metallic alloy of claim 1 as an electrocatalyst.

10. A hydrogen fuel cell comprising an anode employing the metallic alloy of claim 1 as an electrocatalyst.

11. The metallic alloy of claim 1, wherein the metallic alloy is a monolithic catalyst in connection with hydrogen evolution reactions and hydrogen oxidation reactions.

12. The metallic alloy of claim 1, wherein each of the lands or ridges and the troughs or channels has an average width in the range from 0.1 to 10 µm, and wherein the nanopores in the nanoporous lands or ridges have an average size in the range of 2 to 50 nm.

13. The metallic alloy of claim 1, wherein the metallic alloy has a Brunauer-Emmett-Teller (BET) surface area in the range of 15 to 100 $m^2g^{-1}$, as determined by $N_2$ adsorption-desorption measurement.

14. The metallic alloy of claim 1, wherein the metallic alloy is a product formed by a process of contacting a precursor alloy comprising Cu, the one or more metals M and Al with a caustic liquid under conditions sufficient to remove the Al from the precursor alloy.

15. The metallic alloy of claim 14, wherein Al is present in an amount in a range of 50 to 99 at. % and the balance: Cu and M, based on the total amount of Cu, M and Al, and wherein the balance: Cu and M comprises a total amount of the one or more metals M in a range of 1 to 15 at. % and Cu in a range of 85 to 99 at. %, based on the total amount of Cu and M.

16. A metallic alloy comprising Cu and one or more metals M selected from the group consisting of Ti, V, Cr, Mn, Fe, Co, Ni and Zn, wherein a total amount of the one or more metals M is in a range of 1 at. % to 15 at. %, and Cu is in the range of 85 at. % to 99 at. %, based on the total amount of Cu and M, wherein the metallic alloy is a catalyst in connection with hydrogen evolution reactions and hydrogen oxidation reactions.

17. The metallic alloy of claim 16, wherein the alloy consists of Cu and Ti.

18. A water electrolyzer comprising a cathode employing the metallic alloy of claim 16 as an electrocatalyst.

19. A hydrogen fuel cell comprising an anode employing the metallic alloy of claim 16 as an electrocatalyst.

20. The metallic alloy of claim 16, wherein a total amount of the one or more metals M is in a range of 3 at. % to 7 at. %, and Cu is in the range of 93 at. % to 97 at. %, based on the total amount of Cu and M.

21. A method of producing the metallic alloy of claim 1, comprising contacting a precursor alloy comprising Cu, M and Al with a caustic liquid under conditions sufficient to remove the Al from the precursor alloy.

* * * * *